Figure 1:
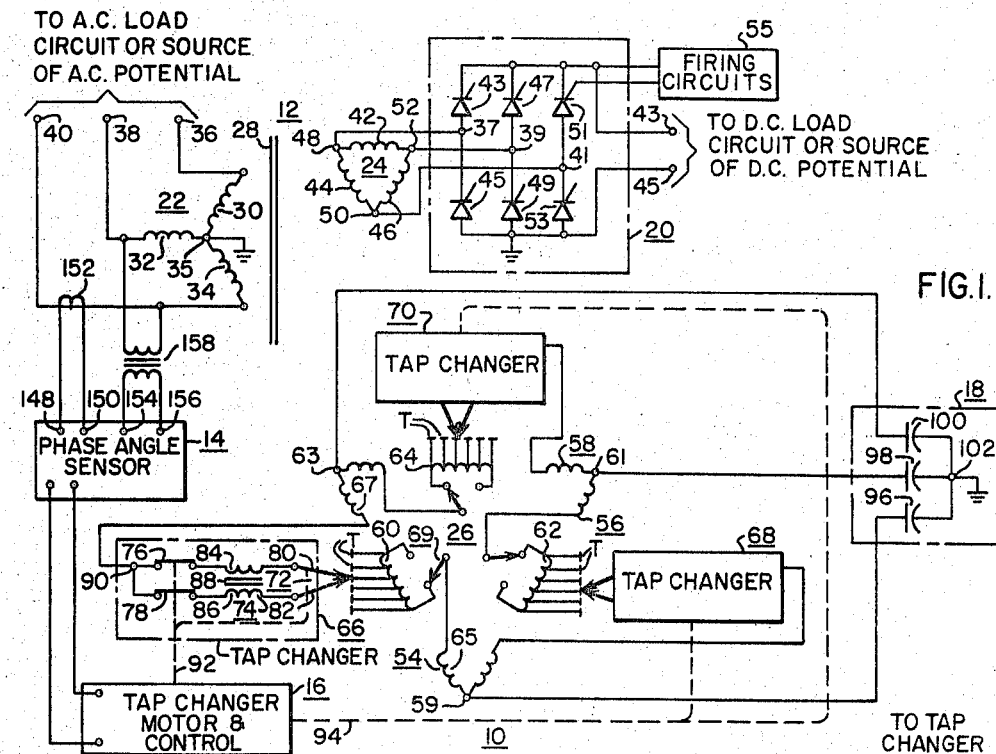

Jan. 14, 1969 T. R. SPECHT ET AL 3,422,343
REACTIVE POWER COMPENSATION BY PHASE ANGLE
CONTROL AND TAP CHANGER MEANS
Filed Nov. 21, 1966

WITNESSES:
Bernard R. Giegung
James F. Young

INVENTORS
Theodore R. Specht &
Glen W. Lake.
BY Donald R. Lackey
ATTORNEY

United States Patent Office 3,422,343
Patented Jan. 14, 1969

3,422,343
REACTIVE POWER COMPENSATION BY PHASE ANGLE CONTROL AND TAP CHANGER MEANS
Theodore R. Specht, Sharon, Pa., and Glen W. Lake, Brookfield, Ohio, assignors to Westinghouse Electric Corporation, Pittsburgh, Pa., a corporation of Pennsylvania
Filed Nov. 21, 1966, Ser. No. 595,920
U.S. Cl. 323—43.5                           4 Claims
Int. Cl. H02p 13/06

This invention relates in general to electrical apparatus for automatically changing reactive power in an electrical system in response to load changes, and more particularly to automatic reactive power compensation systems for electrical converters.

Electrical converters, such as those utilized in high voltage direct current power transmission systems, require reactive compensation. For example, in the proper operation of a static inverter, the current always leads the voltage, making it necessary to provide reactive power compensation from the alternating current side of the inverter, with the necessary kilovars of reactive power being determined by the inverter firing angle, the commutation angle, and the magnitude of the load on the inverter. The reactive power may be supplied by the alternating current system, but since the reactive power causes power losses in the alternating current system between the generating source and the converter, without doing any useful work, it is preferable to supply the reactive power at the converter site, usually in the form of static capacitors. The reactive power may be introduced into the alternating current system by connecting the capacitors to a tertiary winding on the converter transformer. This arrangement allows the voltage applied to the capacitors to be lower than that associated with the high voltage direct current power transmission system, with the turn ratio between the primary winding and the tertiary winding being determined on the basis of providing the tertiary voltage which will allow the most economical selection of commercially available capacitors. This arrangement is also advantageous when the converter is an inverter, because it reduces the commutating reactance of the inverter and thus reduces the commutating angle, lowering the amount of capacitive power or kilovars required for proper inverter operation.

As stated previously, one of the factors which determines the amount of reactive power required by an inverter, is the inverter load. Thus, to maintain the power factor on the alternating current side of an inverter at an optimum value, prior art arrangements connect the capacitors in a plurality of parallel connected sections, with sections of capacitors being switched into and out of the electrical system, as required by the particular loading on the inverter. Switching capacitors is severe duty for switching devices due to the 90 degree phase relationship between the system voltage and the capacitor current, and the high frequency transient current which flows into a capacitor bank when it is energized, with the magnitude of the transient current increasing when parallel connected capacitor banks are switched. Although satisfactory circuit breakers have been developed for capacitor switching, they are costly, and if subjected to a duty cycle such as may be encountered in high voltage direct current power transmission systems, maintenance may be substantial.

Accordingly, it is an object of the invention to provide a new and improved reactive power compensation system for electrical converters.

Another object of the invention is to provide a new and improved reactive power compensation system for electrical converters which maintains a predetermined system phase angle between the system voltage and current as the load on the electrical system changes.

Still another object of the invention is to provide a new and improved reactive power compensation system for electrical converters which automatically maintains a predetermined phase angle between the system voltage and current as the system load changes, without the necessity of switching static capacitors.

Briefly, the present invention accomplishes the above cited objects by providing a converter transformer for the electrical converter which has at least three winding portions. One of the winding portions is adapted for connection to the alternating current system, another of the winding portions is adapted for connection to the converter, and the remaining winding portion, which contains a plurality of tap connections, is connected to the capacitor bank. Sensing means for determining phase angle is connected to the winding portion adapted for connection to the alternating current system, with the phase angle sensing means providing an error signal when the system deviates from a predetermined value. An underload type tap changer system is connected to the taps on the capacitor winding portion, and to the phase angle sensing means, with the error signal from the phase angle sensing means causing the tap changer system to change the turn ratio between the primary winding and the capacitor winding, to provide the voltage across the capacitor bank which will provide the kilovars or reactive power necessary to maintain the predetermined system phase angle. Thus, the complete capacitor bank is always connected into the system, eliminating the need for capacitor switching circuit breakers, which eliminates the maintenance and high voltage transient current associated with switching large parallel connected capacitor banks.

Figure 2:
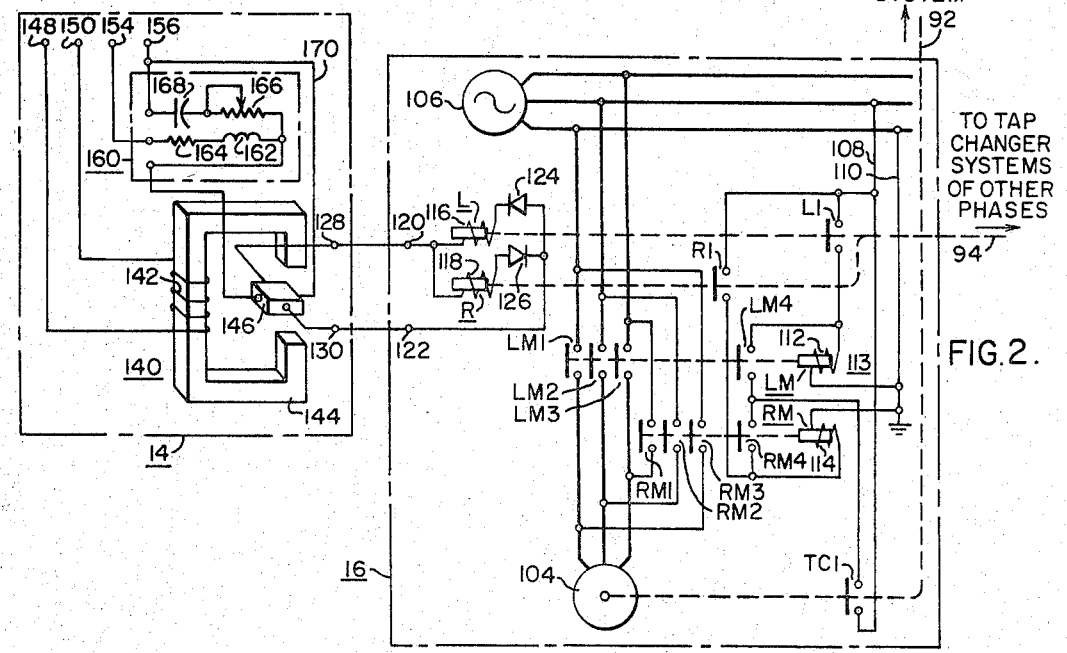

Further objects and advantages of the invention will become apparent from the following detailed description, taken in connection with the accompanying drawings, in which:

FIGURE 1 is a diagrammatic representation, partially in block form, illustrating a reactive power compensation system constructed according to the teachings of the invention; and FIGURE 2 is a schematic diagram of phase angle sensing means and tap changer control apparatus suitable for use with the reactive power compensation system shown in FIGURE 1.

In general, the invention is a reactive power compensation system for electrical converters, which maintains the phase angle of the electrical system substantially constant over the load range of the system, by using a converter transformer having at least three winding portions. A capacitor bank is connected to one of the winding portions, and the voltage across the capacitor bank is changed through tap changer means associated with the capacitor winding, in response to a change in the load or phase angle on another of the windings, to maintain the system phase angle at a predetermined value. This concept is exemplified in the drawings, in which FIGURE 1 illustrates an embodiment of the invention.

FIGURE 1 is a diagrammatic representation of a reactive power compensation system 10 for an electrical converter, constructed according to the teachings of the invention. In general, reactive power compensation system 10 includes a converter transformer 12, phase angle sensing means 14, tap changer motor and control mean 16, tap changer means 66, 68 and 70, capacitor means 18, and electrical converter 20. Converter transformer 12 includes at least three winding portions, with a first winding portion 22 being adapted for connection to a source of alternating potential, or to an alternating potential load circuit, a second winding portion 24 which is connected to the electrical converter 20, and a third winding portion 26 which is connected to capacitor bank 18 and to tap changer means 66, 68 and 70. Converter transformer 12 may be connected in a three-phase electrical system, using three single-phase transformers with their windings connected in predetermined three-phase arrangements, or a single three-phase transformer; or, converter transformer 12 may be a single-phase transformer connected in a single-phase electrical system. Further, converter transformer 12 may be of the isolated winding type, or of the auto-transformer type. For purposes of illustration, converter transformer 12 in FIGURE 1 is a three-phase transformer of the isolated winding type, with the three winding portions being disposed in inductive relation with a magnetic core 28.

More specifically, the first winding portion 22 includes electrical phases 30, 32 and 34, which, in this instance are connected in Y configuration, with their common connection 35 being grounded, if desired. Electrical phases 30, 32 and 34 are connected to terminals 36, 38 and 40, respectively, which may be input terminals if converter 20 is a rectifier, or output terminals if converter 20 is operated as an inverter. If reactive power compensation system 10 is a part of a high voltage direct current power transmission system, the flow of power may be reversible, in which case terminals 36, 38 and 40 may serve both as input and output terminals, depending upon the operating manner of the converter and direction of power flow.

The second winding portion 24 includes electrical phases 42, 44 and 46, which, in this instance, are connected in delta, having terminals 48, 50 and 52 connected to converter 20. Terminals 48, 50 and 52 will be input terminals when converter 20 is operated as an inverter, and output terminals when it is operated as a rectifier.

Converter 20 may be a three-phase bridge type arrangement, having alternating current terminals 37, 39 and 41, and direct current terminals 43 and 45. If converter 20 is to be operated as an inverter, or operated either as an inverter or rectifier upon demand, each leg of the bridge will include a plurality of controlled rectifiers, such as controlled rectifiers 43 and 45, 47 and 49, and 51 and 53, in the three legs, respectively. The controlled rectifiers may be semiconductor silicon controlled rectifiers, or they may be of any other suitable type, such as mercury converter valves. The gate or control electrode and cathode electrodes of each of the controlled rectifiers, such as controlled rectifier 51, are connected to firing circuits shown generally at 55, which control the firing sequence of the controlled rectifiers. If the converter is to be operated only as a rectifier without control as to the magnitude of the direct current output voltage, the controlled rectifiers may be replaced with diodes, such as semiconductor silicon diodes. Each controlled rectifier illustrated in FIGURE 1 may represent a plurality of series and/or parallel connected devices depending upon the current and voltage rating of the bridge, and the current and voltage rating of the devices.

If converter 20 is to be operated as an inverter, terminals 43 and 45 will receive a direct current voltage and change it to an alternating potential having a predetermined frequency, such as 60 cycles, at its alternating current terminals 37, 39 and 41, by firing the controlled rectifiers in a controlled sequence. Firing circuits 55 for performing this function are well known in the art. The firing of the controlled rectifier is advanced in order to complete commutation before voltage zero; thus, the inverter must be operated with a leading power factor. Also, the transfer of current from anode to anode, as each successively becomes more positive, is not accomplished simultaneously at the intersection of their voltage waves due to circuit reactance. The angle of overlap, called the commutating angle, also adds to the leading power factor requirement, with the greater the angle the more reactive compensation required. Connecting the capacitance into the inverter system at the converter transformer reduces the circuit reactance and the angle of overlap. Thus, the capacitor bank 18, in addition to supplying reactive power, actually reduces the amount of reactive compensation required by reducing the commutating angle.

If converter 20 is operated as a rectifier, terminals 37, 39 and 41 will receive an alternating current potential and rectify it to a direct current potential, which will appear at direct current terminals 43 and 45. Power factor correction of the system may be desired, even when converter 20 will be operated only as a rectifier, to correct the power factor of the system due to the inductance of the transmission lines, connected loads, the transformer, and rectifier circuits. The capacitance for this purpose may be introduced in the manner disclosed by the invention.

The third winding portion 26 includes electrical phases 54, 56 and 58, which, in this instance are connected in delta, providing terminals 59, 61 and 63 which are connected to capacitor bank 18. Each of the electrical phases 54, 56 and 58 has a tapped section, such as sections 60, 62, and 64, respectively, which have a plurality of tap connections T thereon. The tapped winding section, such as section 60, of electrical phase 54, may be at either end of the phase, or between two untapped sections as illustrated in FIGURE 1. If desired, the tapped section, such as tap section 60, may include a reversing switch 69 which includes stationary contact terminals connected to each end of the tapped winding section, and a movable contact arm which is adapted to selectively engage either of the two stationary contacts, and which is connected to one of the untapped portions of the electrical phase. The reversing switch extends the tapped range by either adding or subtracting the voltage provided by the tapped winding section, to the voltage of the untapped section or sections. The electrical phases 54, 56 and 58 are completed through tap changer means 66, 68 and 70. Since tap changer means 66, 68 and 70 are similar, only tap changer means 66 is shown in detail.

Specifically, tap changer means 66 may include a no-load type selector switch 72, a preventive autotransformer or split reactor 74, and underload transfer switches 76 and 78. Selector switch 72 includes first and second movable contact arms 80 and 82, and split reactor 74 includes first and second winding portions 84 and 86 wound on a common mangetic core 88. Adjacent ends of reactor winding portion 84 and 86 are connected to movable contact arms 80 and 82, respectively, and the remaining adjacent ends are connected to terminal 90 through transfer switches 76 and 78, respectively. Common terminal 90 is connected to the remaining untapped winding section of its associated electrical phase. Tap changer means 66, which is only one of many suitable arrangements which may be used, is responsive to tap changer motor and control means 16, changing taps on tapped winding section 60 in a substantially arcless manner in response to intelligence received from tap changer motor and control means 16. Tap changer means 66 may operate with both of the movable contact arms 80 and 82 of selector switch 72 on one tape position, or they may operate on adjacent tap positions to provide a voltage midway between tap positions. Split reactor 74 has its winding portions 84 and 86 wound to present a low reactance to the flow of load current, and a high reactance to circulating currents. As is well known in the art, substantially arcless tap changes are made by first opening one of the transfer switches, which allows the load current to continue through the other transfer switch, then the movable contact arm of the branch containing the now open transfer switch may be moved without arcing. Then the open transfer switch closes to complete one-half of a complete tap change cycle. The tap changing cycle then may be continued, if desired, with the other transfer switch opening which allows its associated movable contact arm of the selector switch to move. Then the open transfer switch may close to complete one fully tap change. The switching of transfer switches 76 and 78 and the movement of selector switch 72 are initiated and synchronized by tap changer motor and control means 16, as indicated by dotted line 92. Dotted line 94 indicates that the tap changer motor and control means 16 may also control the operation of tap changer means 68 and 70.

Thus, the number of turns connected in each electrical phase of winding portion 26, and thus the turn ratio between winding portion 26 and whichever of the two winding portions 22 and 24 is the primary winding, depends upon the position of the tap changer means. For example, the complete circuit for electrical phase 54 starts at one of the terminals, such as terminal 59, proceeds through untapped section 65 to reversing switch 66, through the tapped section 60 to the tap or taps to which tap changer means 66 is connected, through tap changer means 66 to untapped section 57, and from there to terminal 63. The circuit effect of the turns of tapped section 60 which are connected in the circuit depends upon the position of reversing switch 66, with the voltage across the connected turns of the tapped section adding to, or subtracting from, the voltage across the untapped sections of the phase.

Terminals 59, 61 and 63 of winding portion 26 are connected to capacitor bank 18, which in this instance is a three-phase bank connected in Y configuration, and represented by capacitors 96, 98 and 100. The common connection of the capacitors of the Y configuration may be grounded, as shown in FIGURE 1.

Thus, tap changer means 66, 68 and 70 will change the voltage appearing at terminals 59, 61 and 63 of winding portion 26, in response to a command from the tap changer motor and control means 16, which receives its intelligence from phase angle sensor 14. When converter 20 is operated as an inverter, this will change the turn ratio between winding portion 24, which will then be the primary winding, and winding portion 26, and thus change the voltage applied to capacitor bank 18. When converter 20 is operated as a rectifier, the tap changer means will change the turn ratio between winding portion 22, which in this instance will be the primary winding, and winding portion 26, which will also change the voltage applied to capacitor bank 18.

The amount of reactive power supplied by capacitor bank 18 may be measured in kilovars. The amount of reactive power or kilovars which will be supplied by each capacitor in capacitor bank 18 is determined by the following relationship:

$$KVAR = \frac{E^2 2\pi f C (10^{-6})}{1000}$$

where

KVAR = the reactive power
E = the RMS voltage applied to the capacitor
$f$ = the frequency in cycles per second
C = the capacitance in microfarads.

Thus, the reactive power or kilovars is proportional to the square of the voltage applied to the capacitors. The reactive power supplied by capacitor bank 18, may, therefore, be controlled by controlling the capacitor voltage from a maximum realized when the voltage provided by all of the turns of the tapped section are aiding or adding to the voltage provided by the turns of the untapped section, to a minimum realized when the voltage provided by all of the turns of the tapped section are opposing the voltage provided by the turns of the untapped sections.

Suitable phase angle sensor means 14 and tap changer motor and control means 16 which may be used in the disclosed reactive power compensation system are shown in detail in FIGURE 2. Phase angle sensing means 14 may be of any suitable construction and arrangement. For example, as shown in FIGURE 2, a conventional VAR transducer may be modified to produce a zero output when the desired phase angle between the system voltage and current have been achieved. When the current and voltage are in phase, the reactive component has a zero magnitude, and a VAR transducer will provide a zero output. By artificially shifting the voltage in the VAR transducer, the VAR transducer may be made to provide a zero output at any desired phase angle, and a polarized error signal at other phase angles, with the polarity of the error signal indicating the direction of the phase angle deviation.

Specifically, phase angle sensor means 14 may include a Hall generator 140, comprising a flux producing coil 142 disposed on a gapped magnetic core structure 144, and a Hall plate 146 disposed in the gap provided in the magnetic core structure 144. Coil 142 is connected to terminals 148 and 150, which are connected to current transformer 152, shown in FIGURE 1, which is disposed to obtain a measure of the current flowing in winding portion 22. Two predetermined opposite ends of Hall plate 146 are connected to terminals 154 and 156, which are connected through potential transformer 158 to obtain a measure of the voltage on winding portion 22. The measure of the voltage is phase shifted before being applied to Hall plate 146, in phase shift network 160. One of the predetermined ends of Hall plate 146 is connected to terminal 154 through serially connected inductance means 162 and resistance means 164, and to terminal 156 through serially connected resistance means 166 and capacitance means 168. The remaining predetermined end of Hall plate 146 is connected to terminal 156 through conductor 170. Resistance means 166 is adjustable, with its resistance setting determining the phase angle at which the output signal of the phase angle sensor will be zero. Hall plate 146 will provide a unidirectional polarized signal from the remaining opposite ends when the phase angle of winding portion 22 is not at the value selected by resistance means 166, which ends are connected to output terminals 128 and 130. Output terminals 128 and 130 of phase angle sensor 14 are connected to input terminals 120 and 122, respectively, of tap changer motor and control means 16. Tap changer motor and control means 16 includes tap changer drive motor and control means 104, which is connected to a source 106 of alternating potential, control means 113 which is connected to source 106 of alternating potential through conductors 108 and 110, and raise and lower relays R and L, respectively. Raise relay R includes an electrical coil 118 and contact R1 connected in control circuit 113. Lower relay L includes an electromagnetic coil 116 and a contact L1 connected in control circuit 113. Raise and lower relays R and L are connected in parallel with respect to input terminals 120 and 122, with oppositely poled diodes 124 and 126 being in the lower and raise branches, respectively. Thus, an output error signal from phase angle sensor 14 at one polarity will energize one of the relays, and a signal of opposite polarity will energize the other of the two relays.

In control circuit 113 contact L1 of lower relay L, and electromagnetic coil 112 of relay LM are serially connected across conductors 108 and 110; and, contact R1 of raise relay R and electromagnetic coil 114 of relay RM, are serially connected across conductors 108 and 110. Contacts LM4 and RM4, in that order, are serially connected from the junction between contact L1 and electromagnetic coil 112, to the junction between contact R1 and electromagnetic coil 114. Contact TC1 is connected from conductor 108 to the junction between contacts LM4 and RM4.

Contacts LM1, LM2 and LM3 of relay LM are connected between tap changer drive means 104, which may be a three-phase electrical motor, and source potential 106; contacts RM1, RM2 and RM3 of relay RM are connected to bridge contacts LM1, LM2 and LM3, and also to interchange two of the electrical phases. Thus, when contacts LM1, LM2 and LM3 close, drive means 104 will rotate in one direction, and when contacts RM1, RM2 and RM3 close, drive means 132 will rotate in the opposite direction.

When contact L1 closes in response to an appropriate signal from phase angle sensor means 14, electromagnetic coil 112 of relay LM will be energized, closing contacts LM1, LM2, LM3 and LM4. Drive means 104 is energized which starts to move tap changer means 66 in a predetermined direction which direction will connect fewer turns of tap section 60 in the circuit when reversing switch 69 is in the position shown in FIGURE 1, and to connect more turns in the circuit when the reversing switch is in the alternate position. When the tap changer drive means 104 starts to operate, contact TC1 closes to seal electromagnetic coil 112 through the now closed contact LM4. Thus, regardless of the subsequent opening of contact L1, tap changer means 66 will continue to operate in its previously energized direction until reaching the next stable operation position. This insures that tap changer means 66 will not stop partially through a tap change. Relays L and R also have contacts similar to contacts L1 and R1, respectively, in each of the tap changer means 68 and 70, to operate the tap changers associated with the other two electrical phases in unison with the tap changer connected in phase 54. Therefore, in describing the operation of tap changer means 66, it will be assumed that tap changer means 68 and 70 will be operating in like manner.

If the desired circuit phase angle is regained by the tap change, contact L1 will open and tap changer means 66 will stop when reaching the first stable operating position in the dierction in which it was driven by drive means 104. If the desired circuit phase angle still has not been achieved, contact L1 will still be closed and tap changer means 66 will again be driven in the same direction to the next stable operating position, and this cycle will repeat until the desired circuit phase angle is obtained. If the phase angle sensor means 14 determines that more turns of the tapped section are required in the circuit, when the reversing switch 69 is in the position shown in FIGURE 1, or fewer turns when the reversing switch 69 is in the alternate position, contact R1 will close, energizing electromagnetic coil 114 of relay RM, closing contacts RM1, RM2, RM3 and RM4. Tap changer drive means 104 will be energized in a direction opposite to the previously driven direction, contact TC1 will close, and relay RM will be sealed through contacts TC1 and RM1 until reaching a stable operating position, at which point contact TC1 will open. If this tap change does not provide the desired circuit phase angle, contact R1 will still be closed, starting the cycle over again, with the cycle repeating until the desired phase angle is obtained.

When the circuit phase angle is leading the desired phase angle, the polarity of the output signal from phase angle sensor means will be such that terminal 130 will be more positive than terminal 128. Lower relay L will be energized, which reduces the effective number of turns of winding portion 26 connected in a circuit, if reversing switch 69 is in the position shown in FIGURE 1, which reduces the voltage across capacitor bank 18, and reduces the amount of reactive power compensation until the circuit phase angle drops back to the predetermined value. If reversing switch 69 is in the alternate position, energizing the lower relay L will increase the effective number of turns of winding portion 26, which also will reduce the voltage across capacitor bank 18, as the voltage provided by the turns is now in opposition to the voltages of the untapped sections, which will reduce the amount of reactive power compensation until the circuit phase angle drops back to the predetermined value. Once the predetermined value is reached, the error signal will be zero, and tap changer means 66 will stop at a stable operating position. When the circuit phase angle is lagging the desired phase angle, the polarity of the output signals from phase angle sensor means 14 will be such that terminal 128 will be more positive than terminal 130. Raise relay R will be energized, to increase the effective number of turns of winding portion 26 connected in the circuit, when reversing switch 69 is in the position shown in FIGURE 1. This will increase the voltage across capacitor bank 18, and increase the amount of capacitive reactive power compensation until the phase angle increases to the predetermined magnitude. If the reversing switch 69 is in the alternate position, energizing raise relay R will decrease the effective number of turns of winding section 26, which reduces the amount of the voltage in opposition to the voltages of the untapped sections, thus increasing the voltage across capacitor bank 18 and increasing the amount of capacitive reactive power compensation.

In summary, there has been disclosed a new and improved reactive power compensation system for electrical converters, which automatically provides the necessary reactive power to maintain a predetermined system phase angle as the system load changes, without the necessity of switching parallel connected banks of capacitors in and out of the system.

Since numerous changes may be made in the above-described apparatus and different embodiments of the invention may be made without departing from the spirit thereof, it is intended that all matter contained in the foregoing description or shown in the accompanying drawings shall be interpreted as illustrative, and not in a limiting sense.

We claim as our invention:

1. A reactive power compensation system for an electrical converter, comprising:
   electrical transformer means including magnetic core means and first, second, and third winding portions disposed in inductive relation with said magnetic core means, said first winding portion being adapted for connection to an alternating current system, said second winding portion being adapted for connection to the electrical converter, said third winding portion having a plurality of tap connections thereon,
   capacitance means, said capacitance means being connected to said third winding portion,
   tap changer means, said tap changer means being connected to tap connections on said third winding portion,
   phase angle sensor means, said phase angle senor means being connected to the first winding portion and to said tap changer means, said phase angle sensor means providing a unidirectional error signal when the phase angle between the voltage and current of said first winding portion deviates from a predetermined value, with the polarity of the unidirectional error signal indicating the direction of the deviation, said tap changer means being responsive to said error signal, changing tap connections and the effective turns of said third winding portions to provid a voltage across said capacitance means which will maintain the predetermined phase angle of said first winding portion as the load on said electrical transformer means changes.

2. The reactive power compensation system of claim 1, including electrical inverter means, said electrical inverter means being connected to said third winding portion.

3. The reactive power compensation system of claim 1, including rectifier means, said rectifier means being connected to said third winding portion.

4. The reactive power compensation system of claim 1, wherein each of said first, second and third winding portions includes three electrical phases, said tap changer means being associated with each of the electrical phases of said third winding portion, changing the number of turns in each of the phases in response to the error signal from said phase angle senor means.

References Cited

UNITED STATES PATENTS

| | | | |
|---|---|---|---|
| 2,994,786 | 8/1961 | Pinney et al. | 323—114 X |
| 3,300,712 | 1/1967 | Segsworth | 323—105 |

JOHN F. COUCH, *Primary Examiner.*

G. GOLDBERG, *Assistant Examiner.*

U.S. Cl. X.R.

307—87, 127; 323—105, 121